Dec. 5, 1967   J. C. F. WHICKER   3,355,959
SCREW AND NUT MECHANISM
Filed Aug. 17, 1965

United States Patent Office 3,355,959
Patented Dec. 5, 1967

3,355,959
SCREW AND NUT MECHANISM
John Charles Frederick Whicker, Tring, England,
assignor to Rotax Limited, London, England
Filed Aug. 17, 1965, Ser. No. 480,289
Claims priority, application Great Britain, Aug. 20, 1964,
34,035/64
3 Claims. (Cl. 74—424.8)

ABSTRACT OF THE DISCLOSURE

A screw and ball nut mechanism having in association with the ball nut, a member defining a rib which is engaged within the groove on the screw, the member being permitted limited angular and axial movement relative to the ball nut, so that during relative movement of the ball nut and screw in one direction the rib will freely engage the groove but during relative movement in the opposite direction a proportion of the load carried by the ball nut will be transferred to the member, stop means being provided to limit the relative angular movement of the member and the ball nut to prevent locking action therebetween.

---

This invention relates to screw and nut mechanism of the recirculating ball type and comprising a shaft in which is formed a helical groove, a ball nut having a helical groove in its internal periphery and a plurality of balls engaging the grooves in the shaft and nut.

The frictional resistance of such mechanism is so small that when an axial load is applied between the ball nut and screw relative rotation may occur and if the mechanism is supporting a load the load will be allowed to descend.

The object of this invention is to combine with such a mechanism convenient means for minimising the tendency for such relative angular movement to occur in a simple and convenient form.

According to the invention in a mechanism of the kind specified there is associated with the ball nut a member which is permitted limited axial and angular movement relative to the axis of the ball nut, said member having a helical rib for engagement with the groove in the shaft, the arrangement being such that during relative rotation of the nut and shaft in one direction the rib will fully engage the groove of the shaft and the load will be carried by the ball nut, but relative movement of the ball nut and shaft in the opposite direction will cause relative angular movement to occur between the member and ball nut and a proportion of the load will be transferred to said member, stop means being provided to limit the extent of relative angular movement of the member when the shaft is moved in said opposite direction.

Figure 1:
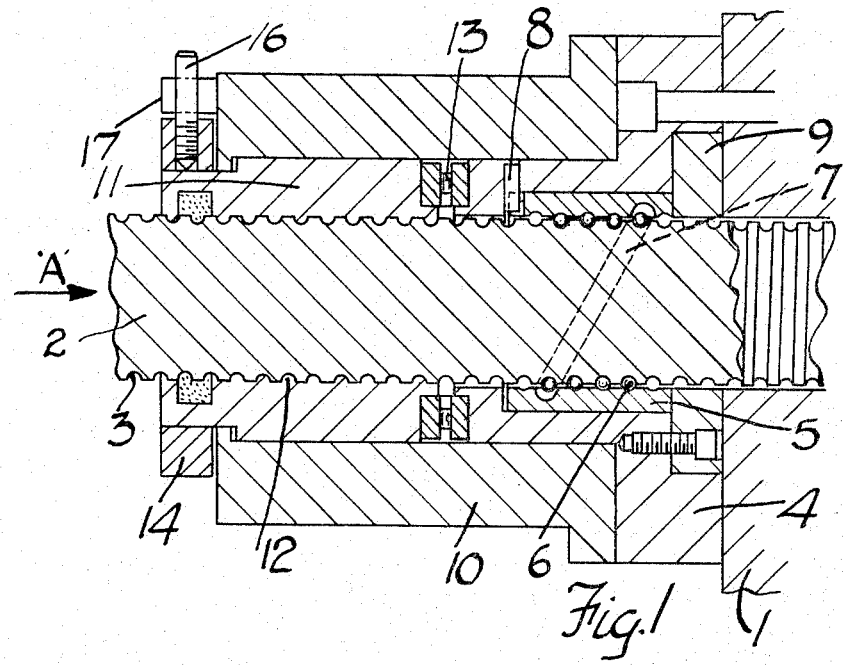
Figure 2:
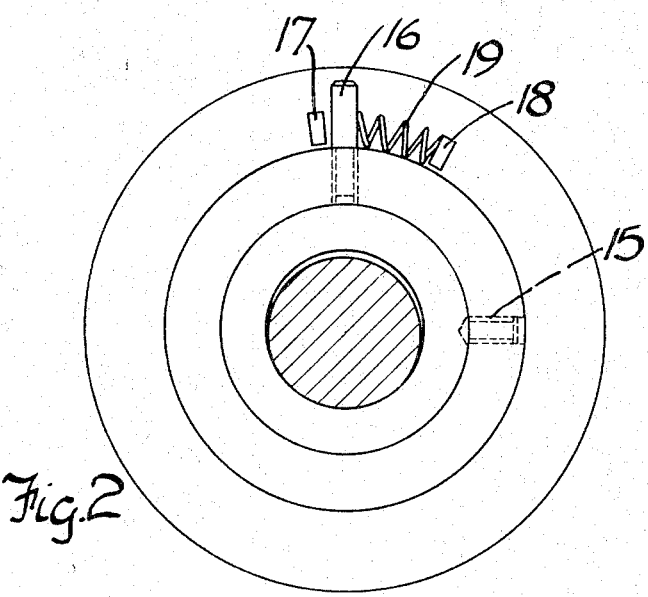

In the accompanying drawings:

FIGURE 1 is a sectional side elevation of one example of a screw and nut mechanism in accordance with the invention and, FIGURE 2 is an end view of the mechanism shown in FIGURE 1.

Referring to the drawings there is provided a housing 1 from which extends a shaft 2 having a helical thread like groove 3 formed therein, the groove being of semi-circular section. Secured to the housing is a ball nut housing 4 of stepped cylindrical form which defines an annular space surrounding the shaft. Mounted within this space is a ball-nut which comprises a tubular member 5 having a groove complementary to the groove on the shaft formed on its internal periphery. Furthermore the member 5 is held against angular movement within the housing 4 by means of a pin 8 extending through the housing and engaging with a notch formed in the member.

Also the member 5 is retained within the housing 4 by a retaining plate 9 secured thereto, limited axial movement being allowed. Also provided is a plurality of balls 6 which are located within the grooves of the member 5 and the shaft, and the arrangement is such that when the shaft is rotated relative to the housing 4 relative axial movement will occur therebetween. Moreover, as is well known in this type of mechanism, a return passage 7 is provided to enable the balls to re-circulate. Furthermore the member 5 is held against angular movement within the housing 4 by means of a pin 8 extending through the housing and engaging with a notch formed in the member. Also the member 5 is held within the housing 4 by a retaining plate 9 secured thereto.

Mounted on the housing 4 is a hollow cylindrical flanged member 10 which defines an annular clearance with the shaft 2. Within this clearance is mounted a hollow cylindrical nut member 11 which on its internal periphery is provided with a rib 12 which is complementary to and which is engaged with the groove in the shaft. Moreover, the nut member 11 is allowed axial and angular movement relative to the axis of the shaft within the flanged member 10. Furthermore, interposed between the nut member 11 and the end of the housing 4 is an anti-friction thrust bearing 13 which comprises two annular rings spaced either side of a series of rollers spaced in a cage. The nut member 11 is extended beyond the end of the flanged member 10 and the extended end thereof has an annular collar 14 secured thereto by means of a grub screw 15. At one point on the periphery of the collar is mounted a radial pin 16 and projecting from the flanged member 10 are a pair of angularly spaced stops 17 and 18. Furthermore, acting between the pin 16 and the stop 18 is a coiled compression spring 19.

The operation of the mechanism is as follows, considering that a load is applied to the shaft 2 in the direction of the arrow A in FIGURE 1 and the housing is fixed. When the shaft is rotated in one direction clockwise in FIGURE 2, the shaft will also be moved axially towards the left by the action of the balls engaging the groove in the shaft and the load will be moved. During this movement the frictional drag between the rib 12 on the member 11 and the groove on the shaft moves the member in the same direction as the shaft is rotating. This movement is opposed by the action of the spring 19 and the drag imparted on the shaft during rotation thereof is very small and will not lower the efficiency of the mechanism by any substantial amount. When the shaft is not driven the load will cause the shaft to be driven in the reverse direction. The initial movement of the shaft will move the nut member to the position in which it is shown in FIGURE 2 with a clearance between the pin 16 and the stop 17. Further angular movement of the shaft will cause the nut member to be moved so that the pin contacts the stop 17. As the member moves to this position relative axial movement will occur between the member 11 and the ball nut, the effect of which is that some of the load or the whole of the load is transmitted to the housing from the shaft by way of the nut member rather than the ball nut. In view of the fact that the mechanical efficiency of the nut member and the shaft is less than 50% the load will remain supported. In order to lower the load the shaft must be rotated in the appropriate direction and in fact the effort required to do this may be greater than the effort required to raise the load.

By limiting the angular movement of the nut member so that the axial clearance between the ball nut and its housing is not completely taken up, the nut member can never act as a lock nut. The relative axial movement between the lock nut and ball nut may be provided as in the present example, by permitting limited axial movement between the step defined on the internal periphery of the housing 4 and the retaining plate 9. Alternatively axial play may be allowed between the member 5 and the shaft, i.e., by suitable choice of the size of the balls 16.

When the shaft is again rotated in a direction to move the load in the direction opposite to that is which it is acting the anti-friction thrust bearing 13 facilitates the angular movement of the nut member so that the load will be retransferred to the ball-nut.

Having thus described my invention what I claim as new and desire to secure by Letters Patent is:

1. A screw and nut mechanism comprising in combination, a housing, a shaft extending through said housing, a helical groove formed in the periphery of said shaft, a ball nut mounted on the housing, a groove formed in the internal periphery of the ball nut, a plurality of balls located in said grooves, passage means through which the balls can return from one end to the other end of the groove as relative rotation occurs between the nut and the shaft, a member mounted within an extension of the housing and having a helical rib formed thereon for engagement with the groove on the shaft, said member being permitted limited axial and angular movement relative to the ball nut so that during relative angular movement of the ball nut and shaft in one direction the rib will freely engage the groove of the shaft, but when relative angular movement of the ball nut and shaft occurs in the opposite direction relative angular movement of the ball nut and member will occur and a proportion of the load carried by the ball nut will be transferred to the member, and stop means mounted on the housing to limit the extent of relative angular movement of the member when the shaft is moved relative to the ball nut in said opposite direction thereby to ensure that the permitted relative axial movement of the ball nut and member is never completely taken up.

2. A mechanism according to claim 1 including resilient means acting upon the member in a manner to urge the member angularly towards said stop means.

3. A mechanism according to claim 2 including an anti-friction thrust bearing mounted intermediate the member and the housing and through which the load carried by the member is transmitted to the housing.

References Cited

UNITED STATES PATENTS

| 2,447,439 | 8/1948 | Thompson | 74—424.8 |
| 2,623,403 | 12/1952 | Terdina | 74—424.8 |
| 3,183,733 | 5/1965 | Whicker | 74—424.8 |

FOREIGN PATENTS

| 1,352,584 | 1/1964 | France. |

DONLEY J. STOCKING, *Primary Examiner.*

L. H. GERIN, *Assistant Examiner.*